United States Patent Office 3,523,874
Patented Aug. 11, 1970

3,523,874
METAL COATING OF AROMATIC POLYMERS
Arabinda N. Dey, Arlington, Mass., assignor to Hooker Chemical Corporation, Niagara Falls, N.Y., a corporation of New York
No Drawing. Filed Mar. 16, 1967, Ser. No. 623,567
Int. Cl. C23b 5/60
U.S. Cl. 204—30
21 Claims

ABSTRACT OF THE DISCLOSURE

Aromatic polymers, particularly those polymers containing aromatic hydrocarbon nuclei, such as polystyrene and phenolic resins, are coated with metals by a process which involves pretreatment of the polymer surface to bond amino radicals or hydroquinone radicals to the aromatic nuclei of the polymer, followed by contacting the chemically treated surface with a metal salt or complex thereof. The process of chemical treatment involves nitration of the aromatic polymer surface to add nitro groups to the aromatic nuclei, followed by reduction with sodium hydrosulfite to convert the nitro groups to amino groups. The amino-modified polymer can be further reacted by diazotization to convert the amino groups to $N_2Cl$ groups, which are replaced by hydroquinone radicals by treating the polymer surface with an alcoholic solution of hydroquinone. The treated surfaces bearing either amino or hydroquinone radicals are subsequently contacted with a metal salt or complex thereof. The resulting treated surface is either conductive or is capable of catalyzing the reduction of a metal salt to produce a conductive surface. Such conductive surfaces are readily electroplated by conventional techniques.

BACKGROUND OF THE INVENTION

There is a rapidly increasing demand for metal plated plastic articles; for example, in the production of low cost plastic articles that have a simulated metal appearance. Such articles are in demand in such industries as automotive, home appliance, radio and television and for use in decorative containers and the like. Heretofore, the metal plating of plastics has required many process steps.

It is an object of this invention to provide a simple process for the metal plating of plastics. A further object of the invention is to provide plastic articles having an adherent metal coating that is resistant to peeling, temperature cycling, and corrosion. Such coatings are electrically conductive whereby static charges are readily dissipated from the plastic surfaces. Such conductive surfaces are useful in printed circuits. The metal coatings further serve to protect plastic articles from abrasion, scratching and marring, reduce their porosity and improve their thermal conductivity.

SUMMARY OF THE INVENTION

This invention provides processes for rendering aromatic polymer surfaces, susceptible to plating or coating with metals. In accordance with the invention, polymers containing aromatic hydrocarbon nuclei are contacted with nitric acid or other suitable nitration agent to form nitro radicals (—$NO_2$) on the aromatic nuclei of the polymer at the surface thereof. Thereafter, the nitrated surface is reduced with an alkali metal hydrosulfite to convert the nitro groups to amino groups. The resulting plastic surface bearing amino groups attached to the aromatic hydrocarbon nuclei is contacted with a diazotization agent to convert the amino groups to $N_2Cl$ groups. Thereafter, the polymer surface is treated with an alcoholic solution of hydroquinone to replace the $N_2Cl$ radicals with hydroquinone radicals.

The aromatic polymers containing either amino radicals or hydroquinone radicals attached to the aromatic hydrocarbon nuclei of the polymer are contacted with a solution of a metal salt or complex thereof. In one aspect of the invention, the resultant surface is electroplated to deposit an adherent metal coating on the plastic surface. In another aspect of the invention, the treated plastic surface is subjected to electroless metal plating to deposit an electroless conductive coating on the plastic surface. Thereafter, the plastic article is electroplated to deposit an adherent metal coating of the desired thickness on the electroless conductive coating.

Further in accordance with the invention, there are provided chemically treated polymer articles produced in accordance with the foregoing processes of the invention. There are also provided polymer articles having adherent metal coatings produced in accordance with the processes of the invention.

DESCRIPTION OF THE PREFERRED EMBODIMENTS

Typical polymers to which the processes of this invention are applicable include the polystyrenes and the phenolic resins.

Polystyrene is readily produced by mass, solution or emulsion polymerization as described in The Technology of Plastics and Resins, Mason, J. P. and Manning, J. F., Van Nostrand Company (1945). The polymerization is promoted by the action of light and catalysts such as hydrogen peroxide, benzoyl peroxide and other organic peroxides. Suitable solvents for solution polymerization are toluene, xylene and chlorobenzene.

The phenolic resins can be produced from phenol itself or the various phenols that are substituted, for example, with hydroxyl groups or with halogen atoms such as fluorine, chlorine or bromine, or with hydrocarbyl radicals, such as alkyl and alkenyl groups of 1 to 18 carbon atoms, alicyclic groups of 5 to 18 carbon atoms and aryl or aralkyl groups of 6 to 18 carbon atoms. Suitable substituted phenols include the following: resorcinol, catechol, hydroquinone, para - tertiary - butylphenol, para-chlorophenol, para-bromophenol, para-fluorophenol, para-tertiary - hexylphenol, para - isooctylphenol, para-phenylphenol, para-benzylphenol, para-cyclohexylphenol, para-octadecyl-phenol, para-nonylphenol, para-beta-naphthylphenol, para-alpha-naphthyl-phenol, para-cetyl-phenol, para-cumyl-phenol and the corresponding ortho- and meta-substituted phenols. In the preparation of the phenol-aldehyde resins, the phenol should have at least two of the three ortho and para positions unsubstituted.

The phenol-aldehyde resins are preferably prepared from formaldehyde, which can be an aqueous solution or any of its low polymeric forms such as paraform or trioxane. The aldehydes preferably contain 1 to 8 carbon atoms. Suitable examples include: acetaldehyde, propionaldehyde, butyraldehyde, benzaldehyde, furfural, 2-ethylhexanol, ethylbutyraldehyde, heptaldehyde, pentaerythrose, glyoxal and chloral.

The preferred phenol-aldehyde resins are the novolac resins which are produced using a ratio of about 0.5 to about 0.9 mole of aldehyde per mole of phenol. These resins are readily cured with a methylene compound, such as hexamethylenetetramine. However, the resoles can also be employed, which are produced using a ratio of at least one mole of aldehyde per mole of the phenol.

The polymers of the invention can be used in the unfilled condition, or with fillers such as glass fiber, glass powder, glass beads, asbestos, talc and other mineral fillers, woodflour and other vegetable fillers, carbon in its various forms, dyes, pigments, and the like.

The polymers of the invention can be in various physical forms, such as shaped articles, for example, moldings, sheets, rods, and the like; fibers, films and fabrics, and the like.

The preferred method for generating amino groups at the surface of the aromatic polymer is to nitrate the surface of the polymer to attach nitro groups to the aromatic hydrocarbon nuclei of the polymer, and thereafter, to reduce the nitro groups to amino groups. The nitration reaction can be conducted in a conventional manner. The preferred nitrating agent is a mixture of concentrated nitric acid and concentrated sulfuric acid. Various proportions of the acids can be employed, for example, from 25 to 75 weight percent nitric acid, the remainder being sulfuric acid, but the preferred proportion is about 50 weight percent nitric acid and 50 weight percent sulfuric acid. The nitration reaction can be carried out at a temperature from about 30 to 100 degrees centigrade, preferably about 70 to 90 degrees centigrade, for a period of 10 seconds to 5 minutes, preferably about 0.5 to 3 minutes. The resulting nitrated surface is preferably washed with water and then contacted with a basic solution of an alkali metal hydrosulfite to reduce the nitro groups to amino groups. Sodium hydrosulfite is preferably employed, but other alkali metal hydrosulfites, such as potassium and lithium hydrosulfites can be employed. The hydrosulfite is preferably employed in aqueous solution that is rendered basic with ammonia. The reduction reaction is carried out at a temperature in the range of about 30 to 100 degrees centigrade, preferably about 50 to 90 degrees centigrade, for about one to 30 minutes, preferably about 2 to 10 minutes. The resulting treated polymer surface has amino groups attached to the aromatic hydrocarbon nuclei of the polymer.

Hydroquinone radicals are preferably generated at the surface of the aromatic polymers of the invention by subjecting an aromatic polymer having amino groups attached to the aromatic hydrocarbon nuclei thereof to a diazotization reaction to convert the amino groups to $N_2Cl$ groups, and thereafter contacting the surface of the aromatic polymer with an alcoholic solution of hydroquinone to replace the $N_2Cl$ groups with hydroquinone radicals. The diazotization reaction can be conducted with any suitable agent for such process, such as nitrous acid. Preferably employed is a mixture of hydrochloric acid and an alkali metal nitrite. The preferred alkali metal nitrite is sodium nitrite, but other such compounds can be used, such as potassium and lithium nitrites. The diazotization reaction can be carried out at a temperature of about 0 to about 25 degrees centigrade, preferably about 5 to 15 degrees centigrade for a period of time from about one to 30 minutes, preferably about 2 to 10 minutes. Thereafter, the polymer surface is washed with water and then contacted with an alcoholic solution of hydroquinone at a temperature of about 20 to about 50 degrees centigrade for a period of time from about one to 30 minutes, preferably about 2 to 10 minutes. The alcoholic hydroquinone solution is prepared using any suitable alcohol, for example, an alcohol of 1 to 10 carbon atoms, such as methyl alcohol, ethyl alcohol, butyl alcohol, heptyl alcohol and decyl alcohol. The resulting chemically treated polymer surface has hydroquinone radicals, bonded to the aromatic hydrocarbon nuclei of the polymer surface.

Following the chemical treatment steps, the plastic surface can be rinsed with a solvent or water, and then, can be dried by merely exposing the plastic surface to the atmosphere or to non-oxidizing atmospheres such as nitrogen, carbon dioxide, and the like, or by drying the surface with radiant heaters or in a conventional oven. Drying times can vary considerably, for example, from one second to 30 minutes or more, preferably 5 seconds to 10 minutes, more preferably 0.5 to 2 minutes. The rinsing and drying steps are optional.

The chemically treated plastic surface can be contacted with a solution of a metal salt or a complex of a metal salt, which is capable of reacting with the treated surface. The metals generally employed are those of Groups I-B, II-B, IV-B, V-B, VI-B, VII-B and VIII of the Periodic Table. The preferred metals are copper, silver, gold, chromium, manganese, cobalt, nickel, palladium, titanium, zirconium, vanadium, tantalum, cadmium, tungsten, molybdenum, and the like.

The metal salts that are used in the invention can contain a wide variety of anions. Suitable anions include the anions of mineral acids such as sulfate, chloride, bromide, iodide, fluoride, nitrate, phosphate, chlorate, perchlorate, borate, carbonate, cyanide, and the like. Also useful are the anions of organic acids such as formate, acetate, citrate, butyrate, valerate, caproate, heptylate, caprylate, naphthenate, 2-ethyl caproate, cinnamate, stearate, oleate, palmitate, dimethylglyoxime, and the like. Generally the anions of organic acids contain 1 to 18 carbon atoms.

Some useful metal salts include copper sulfate, copper chloride, silver nitrate and nickel cyanide.

The metal salts can be complexed with a complexing agent that produces a solution having a basic pH ($>$7). Particularly useful are the ammoniacal complexes of the metal salts, in which one to six ammonia molecules are complexed with the foregoing metal salts. Typical examples include $NiSO_4 \cdot 6NH_3$, $NiCl_2 \cdot 6NH_3$,

$$Ni(C_2H_3OO)_2 \cdot 6NH_3$$

$CuSO_4 \cdot 6NH_3$, $CuCl_2 \cdot 6NH_3$, $AgNO_3 \cdot 6NH_3$, $NiSO_4 \cdot 3NH_3$, $CuSO_4 \cdot 4NH_3$, $Ni(NO_3)_2 \cdot 4NH_3$, and the like. Other useful complexing agents include quinoline, amines and pyridine. Useful complexes include compounds of the formula $MX_2Q_2$ wherein M is the metal ion, X is chlorine or bromine and Q is quinoline. Typical examples include: $CoCl_2Q_2$, $CoBr_2Q_2$, $NiCl_2Q_2$, $NiBr_2Q_2$, $NiI_2Q_2$, $MnCl_2Q_2$, $CuCl_2Q_2$, $CuBr_2Q_2$ and $ZnCl_2Q_2$. Also useful are the corresponding monoquinoline complexes such as $CoCl_2Q$. Useful amine complexes include the mono-(ethylenediamine)-, bis-(ethylenediamine)-, tris-(ethylenediamine)-, bis-(1,2-propanediamine)-, and bis(1,3-propanediamine)-complexes of salts such as copper sulfate. Typical pyridine complexes include $NiCl_2(py)_2$ and $CuCl_2(py)_2$ where py is pyridine.

The foregoing metal salts and their complexes are used in ionic media, preferably in aqueous solutions. However, nonaqueous media can be employed such as alcohols, for example, methyl alcohol, ethyl alcohol, butyl alcohol, heptyl alcohol, decyl alcohol, and the like. Mixtures of alcohol and water can be used. Also useful are mixtures of alcohol with other miscible solvents of the types disclosed hereinbefore. The solution concentration is generally in the range from about 0.1 weight percent metal salt or complex based on the total weight of the solution up to a saturated solution, preferably from about one to about 10 weight percent metal salt or complex. The pH of the metal salt or complex solution is generally maintained in the range from about 7 to 14, more preferably from about 10 to about 13.

The step of contacting the chemically treated plastic surface with the solution of metal salt is generally conducted at a temperature below the softening point of the plastic, and below the boiling point of the solvent, if one is used. Generally, the temperature is in the range of about 30 to 110 degrees centigrade, preferably from about 50 to 100 degrees centigrade. The time of contact can vary considerably, depending on the nature of the plastic, the characteristic of the metal salts employed and the contact temperature. However, the time of contact is generally in the range of about 0.1 to 30 minutes, preferably about 5 to 10 minutes.

Depending on the conditions employed in the two treatment steps, the duration of the treatments, and the nature of the plastic treated, the resulting treated plastic surface may be either (1) conductive, such that the surface can be readily electroplated by conventional techniques, or (2) non-conductive. In the latter instance, the treated surface contains active or catalytic sites that render the surface susceptible to further treatment by electroless plating processes that produce a conductive coating on the plastic surface. Such a conductive coating is then capable of being plated by conventional electrolytic processes.

The treated plastic surfaces that result from contacting the chemically treated surface with a metal salt solution can be subjected to a process that has become known in the art as electroless plating or chemical plating. In a typical electroless plating process, a catalytic plastic surface is contacted with a solution of a metal salt under conditions in which the metallic ion of the metal salt is reduced to the metallic state and deposited on the catalytic plastic surface. The use of this process with the plastic products of this invention relies upon the catalytic metal sites deposited on the plastic surface as a result of the treatment with the solution of metal salt or complex of this invention. A suitable chemical treating bath for the decomposition of a nickel coating on the catalytic plastic surface produced in accordance with the process of the invention can comprise, for example, a solution of a nickel salt in an aqueous hypophosphite solution. Suitable hypophosphites include the alkali metal hypophosphites such as sodium hypophosphite and potassium hypophosphite, and the alkaline earth metal hypophophites such as calcium hypophosphite and barium hypophosphite. Other suitable metal salts for use in the chemical treating bath include the metal salts described hereinbefore with respect to the metal salt treatment of the chemically treated plastic surface of the invention. Other reducing media include formaldehyde, hydroquinone and hydrazine. Other agents, such as buffering agents, complexing agents, and other additives are included in the chemical plating solutions or baths.

The treated plastic surfaces of the invention that are conductive can be electroplated by the processes known in the art. The plastic article is generally used as the cathode. The metal desired to be plated is generally dissolved in an aqueous plating bath, although other media can be employed. Generally, a soluble metal anode of the metal to be plated can be employed. In some instances, however, a carbon anode or other inert anode is used. Suitable metals, solutions and conditions for electroplating are described in Metal Finishing Guidebook Directory for 1967, published by Metals and Plastics Publications, Inc., Westwood, N.J.

The following examples serve to illustrate the invention, but are not intended to limit it. Unless otherwise specified, all temperatures are in degrees centigrade and parts are understood to be expressed in parts by weight.

EXAMPLE 1

A sheet of polystyrene was contacted with a mixture of 1 part by weight of concentrated nitric acid and 1 part by weight of concentrated sulfuric acid at 85 degrees centigrade for one minute. The plastic surface was washed with water and then contacted with an aqueous, ammoniacal solution of sodium hydrosulfite at 70 degrees centigrade for five minutes. Thereafter, the plastic article was washed with water and then contacted with an aqueous solution of sodium nitrite and hydrogen chloride at 10 degrees centigrade for five minutes. The polystyrene sheet was again washed with water and then contacted with an alcoholic solution of hydroquinone.

The resulting chemically treated sheet of polystyrene was contacted with an aqueous, ammoniacal solution that was saturated with silver nitrate, for five minutes to produce a shiny, non-conductive, silver coating on the polystyrene sheet. The plastic sheet was washed with water and then subjected to the last three steps of the electroless nickel plating MACuplex process of the MacDermid Company (as described in bulletin number PL-202 of said company, dated Nov. 26, 1965) to apply a nickel film to the chemically treated surface. The plastic article was then electroplated using the conventional Watts nickel plating process. A strongly adherent nickel coating was obtained on the polystyrene sheet.

EXAMPLE 2

A sheet of polystyrene was contacted with a mixture of 1 part by weight of concentrated nitric acid and 1 part by weight of concentrated sulfuric acid at 85 degrees centigrade for one minute. The plastic surface was washed with water and then contacted with an aqueous, ammoniacal solution of sodium hydrosulfite at 70 degrees centigrade for five minutes.

The resulting chemically treated sheet of polystyrene was contacted with an aqueous, ammoniacal solution that was saturated with silver nitrate, for five minutes to produce a shiny, nonconductive, silver coating on the polystyrene sheet. The plastic sheet was washed with water and then subjected to the last three steps of the electroless nickel plating MACuplex process of the McDermid Company to apply a nickel film to the chemically treated surface. The plastic article was then electroplated using the conventional Watts nickel plating process. A strongly adherent nickel coating was obtained on the polystyrene sheet.

EXAMPLE 3

A sheet of polystyrene was contacted with a mixture of 1 part by weight of concentrated nitric acid and 1 part by weight of concentrated sulfuric acid at 85 degrees centigrade for one minute. The plastic surface was washed with water and then contacted with an aqueous ammoniacal solution of sodium hydrosulfite at 70 degrees centigrade for five minutes.

The plastic sheet was washed with water and then subjected to the last three steps of the electroless nickel plating MACuplex process of the MacDermid Company to apply a nickel film to the chemically treated surface. The plastic article was then electroplated using the conventional Watts nickel plating process. A strongly adherent nickel coating was obtained on the polystyrene sheet.

EXAMPLE 4

A bottle cap made from a molded phenol-formaldehyde resin that had been cross-linked with hexamethylenetetramine was contacted with a mixture of 1 part by weight of concentrated nitric acid and 1 part by weight of concentrated sulfuric acid at 85 degrees centigrade for one minute. The plastic surface was washed with water and then contacted with an aqueous ammoniacal solution of sodium hydrosulfite at 70 degrees centigrade for five minutes.

The plastic sheet was washed with water and then subjected to the last three steps of the electroless nickel plating MACuplex process of the MacDermid Company to apply a nickel film to the chemically treated surface. The plastic article was then electroplated using the conventional Watts nickel plating process. A strongly adherent nickel coating was obtained on the phenolic resin.

EXAMPLE 5

The process of Example 4 was repeated with a phenol-formaldehyde molded bottle cap, except that following the electroless nickel process, the bottle cap was electroplated with copper in a conventional copper plating electrolytic cell. A uniform, adherent copper plate was obtained.

Various changes and modifications can be made in the process and products of this invention without departing from the spirit and scope of the invention. The various embodiments of the invention disclosed herein serve to further illustrate the invention but are not intended to limit it.

I claim:
1. A process which comprises contacting the surface of an aromatic polymer article with a nitration agent to form nitro groups on the aromatic hydrocarbon nuclei of the polymer, and without an intervening cleaning treatment other than water washing contacting the surface of the aromatic polymer with a reducing agent to convert said nitro groups to amino groups, wherein the aromatic polymer is a polystyrene or a phenolic resin.

2. A process which comprises contacting the surface of an aromatic polymer article with a nitration agent to form nitro groups on the aromatic hydrocarbon nuclei of the polymer, contacting the surface of the aromatic polymer with a reducing agent to convert said nitro groups to amino groups and thereafter contacting the surface of the treated polymer with a diazotization agent to convert the amino groups to $N_2Cl$ groups, and thereafter contacting the polymer with an alcoholic solution of hydroquinone to replace said $N_2Cl$ groups with hydroquinone radicals, wherein the aromatic polymer is a polystyrene or a phenolic resin.

3. The process of claim 2 wherein the diazotization agent is an aqueous solution of sodium nitrite and hydrogen chloride.

4. A process wherein a treated polymer surface resulting from the process of claim 2 is subjected to an electroless metal plating process to deposit an electroless conductive coating on the treated polymer surface.

5. A process wherein the coated polymer surface resulting from the process of claim 4 is electroplated to deposit an adherent metal coating on the electroless conductive coating.

6. A process wherein a treated polymer surface resulting from the process of claim 2 is contacted with a solution of a metal salt or complex thereof, wherein the metal is selected from Groups I–B, II–B, IV–B, V–B, VI–B, VII–B, and VIII of the Periodic Table.

7. A process wherein the treated plastic surface resulting from the process of claim 6 is electroplated to deposit an adherent metal coating on the treated plastic surface.

8. A process wherein a treated polymer surface resulting from the process of claim 6 is subjected to an electroless metal plating process to deposit an electroless conductive coating on the treated polymer surface.

9. A process wherein the coated polymer surface resulting from the process of claim 8 is electroplated to deposit an adherent metal coating on the electroless conductive coating.

10. The process of claim 1 wherein said reducing agent is an alkali metal hydrosulfite.

11. The process of claim 10 wherein the nitration agent is a mixture of nitric acid and sulfuric acid, and the reducing agent is an aqueous, ammoniacal solution of sodium hydrosulfite.

12. A process wherein a treated polymer surface resulting from the process of claim 10 is subjected to an electroless metal plating process to deposit an electroless conductive coating on the treated polymer surface.

13. A process wherein the coated polymer surface resulting from the process of claim 12 is electroplated to deposit an adherent metal coating on the electroless conductive coating.

14. A process wherein a treated polymer surface resulting from the process of claim 10 is contacted with a solution of a metal salt or complex thereof, wherein the metal is selected from Groups I–B, II–B, IV–B, V–B, VI–B, VII–B, and VIII of the Periodic Table.

15. A process wherein a treated polymer surface resulting from the process of claim 14 is subjected to an electroless metal plating process to deposit an electroless conductive coating on the treated polymer surface.

16. A process wherein the coated polymer surface resulting from the process of claim 15 is electroplated to deposit an adherent metal coating on the electroless conductive coating.

17. A process wherein the treated plastic surface resulting from the process of claim 4 is electroplated to deposit an adherent metal coating on the treated plastic surface.

18. An aromatic polymer article having hydroquinone radicals attached to the aromatic hydrocarbon nuclei at the surface of the aromatic polymer article, wherein the aromatic polymer is a polystyrene of a phenolic resin, produced by a process which comprises contacting the surface of said aromatic polymer article with a nitration agent to form nitro groups on the aromatic hydrocarbon nuclei of the polymer, contacting the surface of the aromatic polymer with a reducing agent to convert said nitro groups to amino groups, contacting the treated polymer surface with a diazotization agent to convert said amino groups to $N_2Cl$ groups, and thereafter contacting the polymer with an alcoholic solution of hydroquinone to replace said $N_2Cl$ groups with hydroquinone radicals.

19. The article of claim 18 wherein the aromatic polymer is polystyrene.

20. The article of claim 18 wherein the aromatic polymer is a phenolic resin.

21. The article of claim 20 wherein the phenolic resin is a phenol-formaldehyde resin.

References Cited

UNITED STATES PATENTS

| | | | |
|---|---|---|---|
| 2,217,263 | 10/1940 | Waterman et al. | 260—622 X |
| 2,917,439 | 12/1959 | Liu | 204—30 X |
| 3,296,013 | 1/1967 | Feeley | 117—60 |

OTHER REFERENCES

Narcus: "The Electrodeposition of Metals on Plastics," The Electrochemical Society Preprint 88–5, Oct. 8, 1945, pp. 29 to 45.

DANIEL E. WYMAN, Primary Examiner

W. H. CANNON, Assistant Examiner

U.S. Cl. X.R.

106—1; 117—47